United States Patent Office 3,203,819
Patented Aug. 31, 1965

3,203,819
PROCESS FOR THE PRODUCTION OF GRANULES FROM MIXTURES OF CARBON BLACK AND LIGHT FILLERS
Gerhard Steenken, Berzbuir, near Duren, Albert Peters, Godorf, Kreis Cologne, and Johannes Pochert, Wesseling, Bezirk Cologne, Germany, assignors to Deutsche Gold- und Silber-Scheideanstalt vormals Roessler, Frankfurt am Main, Germany
No Drawing. Filed Dec. 6, 1962, Ser. No. 242,621
Claims priority, application Germany, Dec. 18, 1961, D 37,713
5 Claims. (Cl. 106—307)

The present invention relates to an improved process for the production of granulated or pelletized mixtures of carbon black with light fillers obtained by wet precipitation which are especially suited as reenforcing fillers for natural and synthetic rubbers.

It is known, that, for certain purposes, it is advantageous to use filler mixtures consisting of carbon black and light fillers such as silica or silicates for the reenforcement of natural and synthetic rubbers. These so-called "black-white-mixtures," for example, provide good properties in rubber compositions used for the production of shoe soles, tires and the like articles which are subject to dynamic stresses. It is possible with the use of such mixtures to achieve high filling degrees without deleteriously affecting the properties of the rubber. In many instances even an improvement in such properties is attained. However, the addition of both filler components, of which the carbon black is usually in pelletized form, to the master batch involves certain difficulties as there is always the danger that separation of the components of the mixtures can occur during their delivery to the roller or kneader from the storage vessel whereby the dosage becomes inaccurate. In itself, it is difficult to mix fillers in powdered and pelletized form at the same time without disturbance of the carbon black granules. If one desired to produce granulates from both of the filler components in order to be able to supply them in such form to the master batch, it would be necessary to moisten the carbon black which is produced in dry form and remoisten the precipitated and dried silica or other white filler in order to be able to shape the mixtures. As the particles of the fillers have extraordinarily high surface areas, considerable quantities of water are required for this purpose. If one desires to produce a homogenous granulatable dough in this way, one part by weight of water must be used per part of carbon black and two parts by weight of water per part of silica filler. The water thus added must again be removed during the granulation procedure. For example, in the case of a mixture of 50 kg. of carbon black and 50 kg. of silica it would be necessary to evaporate 150 kg. of water, which requires about 300 kg. of steam. In addition to this the heat requirements for the original drying of light filler produced by wet precipitation procedures are saved.

According to the invention it was found that granulated mixtures of carbon black and wet precipitated light fillers could be obtained in an economical manner, that is, without requiring evaporation of impractically large quantities of water, when practically dry unpelletized carbon black is mixed into a primary filter cake dough of the precipitated light filler until as homogeneous a mass as possible is obtained and such mass is then shaped to granules in a manner known per se and dried. The term "primary filter cake dough" is employed herein to signify the moist filter cake obtained directly upon filtering the wet precipitated filler from the aqueous medium in which it is produced without drying.

In the process according to the invention a light filler dough is used as a starting material in the form it normally occurs in the production of such fillers, such as, for example, silica or silicate fillers, by known methods, namely, with a solids content of about 15% to 25% by weight. The water retained in such dough is not removed but rather utilized to enable the admixture of carbon black therewith to produce a homogeneous kneadable and shapable mass. This eliminates the necessity of evaporating the additional water normally required for converting the dry filler mixtures into a shapable dough. According to the invention the carbon black depending upon its nature can, for example, be added to the light filler dough in proportions ranging from 1:99 parts by weight of silica to 70:30 parts by weight of silica. Within this range of proportions the masses which can be obtained are easily kneaded and shaped so that homogeneous mixed granulates are easily obtainable therefrom. If the proportions of the carbon black are raised above the range given so that, for example, 80 parts of carbon black are to be mixed with 20 parts of silica, a small additional quantity of water is required above that contained in the moist silica filter cake in order that a kneadable and shapable mass be produced therefrom. However, such additional quantity of water is only a small fraction of that which would have been required if dry powdered carbon black and silica were employed to start with.

Wet precipitated silica (silicic acid) preferably is employed as the light filler in the carbon black containing mixtures concerned in the invention. However, wet precipitated silicates also come into consideration. Wet precipitated silicas used as fillers are usually prepared by precipitation from aqueous alkali metal silicate solutions, especially water glass solutions, with the aid of a mineral acid, preferably hydrochloric acid. Wet precipitated silicate fillers normally are prepared with the aid of salts of mineral acids, such as calcium chloride or aluminum sulfate, which upon addition to, for example, water glass solutions cause precipitation of calcium silicate or, respectively, aluminum silicate.

The carbon black can be worked into the light filler dough with the aid of known apparatus such as kneaders. The granulation also is carried out according to known methods, such as, for example, with the aid of granulating rollers and granulating drums.

In order to increase the strength of the granulated product known water soluble bonding agents can be added while the carbon black is admixed with the light filler dough.

The process according to the invention renders it possible to produce mixed granulation products which are especially suitable for admixture with rubber compositions. The granuation products do not dust when they are poured into the kneader or roller. In addition, working such a granulated product into the rubber sheet does not require as much time as is required when the silica and carbon black, in powdered or pelletized form, are added separately. In addition, the use of the mixed granulates according to the invention assures a fully homogeneous mixture of both filler components.

The following examples illustrate several embodiments of the invention.

EXAMPLE 1

1000 kg. of a silicic acid filter cake dough with a solids content of 17.5% obtained in the production of silicic acid by precipitation from a water glass solution with HCl was kneaded into a plastic mass in a kneader. During such kneading 408 kg. of powdered carbon black were added gradually and the kneading of the mass continued until a graphitic sheen occurred therein. Homogeneous distribution of the carbon black occurred after about 10–15 minutes' kneading. The resulting mixed kneadable mass was then granulated in a drum granulator.

EXAMPLE 2

1000 kg. of a silicic acid filter cake dough as in Example 1 was kneaded. During such kneading 700 kg. of carbon black powder and 400 kg. of water were added portionwise and the kneading continued until a homogeneous mass was obtained which was then granulated in a drum granulator. The silicic acid filter cake dough employed as a starting material contained 175 kg. of silicic acid. If powdered filler components had been employed as starting materials 350 kg. of water would have been required for the 175 kg. of silicic acid and 700 kg. of water for the 700 kg. of carbon black so that a total of 1150 kg. of water would have been required (the quantity of water which had to be evaporated in the production of the dry light filler being disregarded). In contrast thereto in the process according to the invention it was only necessary that 400 kg. of additional water be employed so that a considerable saving of the evaporation costs was obtained.

EXAMPLE 3

1.5 kg. of silicic acid filter cake dough obtained in a manner analogously to that of Example 1 but containing 18.8% of solids was kneaded until a paste was formed. Then 658 g. of a gas black were kneaded into such paste over a 35 minute period. The solids content of the resulting homogeneous doughy mixture was 43.5%. A granulate was prepared from such mixture with a granulating apparatus employing a pocketed roller and a smooth roller running towards each other. The resulting dried granules exhibited a breaking pressure of 249 g. (average of 10 measurements). The poured weight was 309 g./l, and the tamped weight was 349 g./l.

When a gear wheel granulator with a granulating roller and swinging nozzles was employed the resulting granulates exhibited a breaking pressure of 587 g., a poured weight of 280 g./l, and a tamped weight of 309 g./l.

EXAMPLE 4

A doughy mixture was prepared as in Example 3 except that the gas black was replaced by a flame black. The granulation thereof was effected on a granulating machine with two pressure rollers. The breaking pressure exhibited by the granulates thus obtained as an average was about 91 g. The poured weight was 306 g./l. and the tamped weight 309 g./l.

Pellets of a diameter of 3–4 mm. produced solely from the carbon black employed exhibit a breaking pressure of 83 g., a poured weight of 339 g./l. and a tamped weight of 384 g./l.

EXAMPLE 5

(a) 2 kg. of an aluminium silicate filter cake dough with a solids content of 28.5%, obtained by precipitation from water glass solution with an aluminium sulfate solution was kneaded in a kneader. During such kneading 996 g. of powdered carbon black were added gradually. As described in Example 1 the total amount of solids content was 46.9%.

(b) Example 5(a) was repeated except that 1 kg. filter cake and 665 g. carbon black were used.

From the products according to Examples 5(a) and 5(b) pellets with different diameters were produced. The mechanical properties of these pellets are listed in Table I.

*Table I*

| Proportions of aluminum silicate and carbon black | Pellets, diameter (mm.) | Breaking pressure (g.) | Poured weight (g./l.) | Tamped weight (g./l.) |
|---|---|---|---|---|
| 100:0 | 4 | 714 | 244 | 270 |
| 45:55 | 4 | 404 | 323 | 357 |
| 45:55 | 3 | 280 | 323 | 370 |
| 30:70 | 4 | 133 | 357 | 435 |
| 30:70 | 3 | 105 | 357 | 435 |

We claim:
1. In a process for the production of a mixed reinforcing filler for rubber from carbon black and wet precipitated light fillers selected from the group consisting of wet precipitated silicic acid and silicate fillers, the steps which comprise homogeneously mixing the carbon black in substantially dry non-pelletized form with the light filler in the form of a primary moist filter cake dough in the presence of a sufficient quantity of water to produce an aqueous shapeable mass, forming granules from such mass and drying such granules.

2. In a process for the production of a mixed reinforcing filler for rubber from carbon black and wet precipitated light fillers selected from the group consisting of wet precipitated silicic acid and silicate fillers, the steps which comprise homogeneously mixing the carbon black in substantially dry non-pelletized form with the light filler in the form of a primary moist filter cake dough containing about 15 to 28.5% of solids to produce an aqueous shapeable mass, the proportions of carbon black to light filler being between 1:99 to 70:30 parts by weight, forming granules from such mass and drying such granules.

3. The process of claim 2 in which said light filler is wet precipitated silicic acid.

4. The process of claim 2 in which said light filler is wet precipitated calcium silicate.

5. The process of claim 2 in which said light filler is wet precipitated aluminum silicate.

References Cited by the Examiner

UNITED STATES PATENTS 1,940,352  12/33  Jacobson _____ 106—307
2,900,737  8/59  Heller _____ 106—307

TOBIAS E. LEVOW, *Primary Examiner.*